(12) United States Patent
Brekelmans et al.

(10) Patent No.: US 8,207,878 B2
(45) Date of Patent: Jun. 26, 2012

(54) DEVICE FOR RECEIVING A RF SIGNAL WITH LOOP-THROUGH OUTPUT AND METHOD FOR LOOPING A RF INPUT SIGNAL THROUGH A DEVICE FOR RECEIVING RF SIGNALS

(75) Inventors: Johannes Hubertus Antonius Brekelmans, Nederweert (NL); Konstantinos Doris, Amsterdam (NL); Erwin Janssen, Veldhoven (NL)

(73) Assignee: NXP B.V. (NL)

( * ) Notice: Subject to any disclaimer, the term of this patent is extended or adjusted under 35 U.S.C. 154(b) by 145 days.

(21) Appl. No.: 12/744,693

(22) PCT Filed: Nov. 24, 2008

(86) PCT No.: PCT/IB2008/054926
§ 371 (c)(1),
(2), (4) Date: May 26, 2010

(87) PCT Pub. No.: WO2009/069065
PCT Pub. Date: Jun. 4, 2009

(65) Prior Publication Data
US 2010/0302082 A1    Dec. 2, 2010

(30) Foreign Application Priority Data

Nov. 27, 2007    (EP) .................................... 07121681

(51) Int. Cl.
*H03M 1/10*    (2006.01)

(52) U.S. Cl. .......... 341/110; 455/3.06; 702/151
(58) Field of Classification Search .......... None
See application file for complete search history.

(56) References Cited

U.S. PATENT DOCUMENTS 4,811,097 A * 3/1989 Ritter et al. .......... 348/608
(Continued)

FOREIGN PATENT DOCUMENTS

DE    34 40 119 A1    5/1986
(Continued)

OTHER PUBLICATIONS

Srinivas, V. "A Distortion Compensating Flash Analog-to-Digital Conversion Technique"; IEEE J. of Solid-State Circuits, vol. 41, No. 9, pp. 1959-1969 (Sep. 2006).
(Continued)

*Primary Examiner* — Howard Williams
(74) *Attorney, Agent, or Firm* — Kramer & Amado P.C.

(57) ABSTRACT

A device for receiving a RF signal (1; 21) with loop-through output (16) is provided. The device comprises: an input (3) receiving a RF input signal (2); an analog-digital converter (8) converting the RF input signal (2) to a digital signal (9); a digital signal processing unit (10) digitally processing the digital signal (9); a digital-analog converter (14) converting the processed digital signal (13) to a loop-through RF signal (15) corresponding to the RF input signal (2); and a loop-through output (16) outputting the loop-through RF signal (15).

20 Claims, 4 Drawing Sheets

U.S. PATENT DOCUMENTS

| | | | |
|---|---|---|---|
| 6,002,352 A | 12/1999 | El-Ghoroury et al. | |
| 7,809,047 B2 * | 10/2010 | Kummetz | 375/211 |
| 2004/0160274 A1 | 8/2004 | Gurvich et al. | |
| 2005/0125839 A1 * | 6/2005 | Coman | 725/115 |
| 2006/0098758 A1 | 5/2006 | Luke et al. | |
| 2006/0125559 A1 | 6/2006 | Garbi et al. | |
| 2007/0166003 A1 * | 7/2007 | Herz et al. | 386/83 |
| 2010/0085231 A1 | 4/2010 | Doris | |

FOREIGN PATENT DOCUMENTS

| | | | |
|---|---|---|---|
| JP | 2004165908 A * | 6/2004 | |
| WO | 99/55085 A2 | 10/1999 | |
| WO | 01/91288 A1 | 11/2001 | |
| WO | 02/078333 A1 | 10/2002 | |
| WO | 2008/072130 A1 | 6/2008 | |
| WO | 2009/098641 A1 | 8/2009 | |

OTHER PUBLICATIONS

Harpe, P. et al. "Digital Post-Correction of Front-End Track-and-Hold Circuits in ADCs", Circuits and Systems, 4 pgs. (May 2006).

Harpe, P. et al. "Digital Self-Correction of Time-Interleaved ADCs"; IEEE Symp. on Circuits and Systems, vol. 6, pp. 5541-5544 (May 2005).

EDN "NXP Introduces DVB-T Silicon Tuner for SD/HD STBs"; 1 pg., Reed Business Information, Division of Reed Elsevier Inc. (2004).

NXP, B.V.; "NXP Introduces Industry's First Pure DV Silicon Tuner for SD/HD Set-Top Boxes", 1 pg. (2007).

International Search Report and Written Opinion for Int'l. Patent Appln. No. PCT/IB2008/054926 (Mar. 19, 2009).

* cited by examiner

DEVICE FOR RECEIVING A RF SIGNAL WITH LOOP-THROUGH OUTPUT AND METHOD FOR LOOPING A RF INPUT SIGNAL THROUGH A DEVICE FOR RECEIVING RF SIGNALS

FIELD OF THE INVENTION

The invention relates to a device for receiving a RF signal with loop-through output and to a method for looping a RF input signal through a device for receiving RF signals. More specifically, the invention relates to a device for receiving a RF signal with loop-through output in which a RF input signal is digitally processed before being output as a loop-through RF signal at a loop-through output.

BACKGROUND OF THE INVENTION

In the context of the present application, RF signals will be understood to mean analog signals comprising a plurality of frequencies, e.g. frequencies in the frequency band between 45 and 1040 MHz. A large number of different devices for receiving RF signals (radio frequency signals) can be found on the market. Examples for such devices are TV tuners for cable modems, DVD recorders, Set Top Boxes, USB dongles, PC add-on cards, TV's and other RF apparatuses. In such devices, a RF input signal is applied to an input of the device and the device is adapted to sample the RF input signal. In such devices, for example in case of TV tuners, the RF input signal comprises a plurality of frequencies and channels and a required channel selection and frequency conversion is performed in the device in order to provide a user with specific signals corresponding to particular channels.

In certain cases, the RF input signal has to be applied to more than one appliance, for example to a DVD recorder and to a TV apparatus. To this purpose, the RF input signal, which is an antenna signal for example, can be first split and then routed to each of these appliances. However, this is inconvenient for users and requires an additional RF splitter device. Therefore, the devices for receiving RF signals, such as DVD recorders, are usually equipped with a so called loop-through output that is adapted such that the RF input signal is fed out again via a loop-through output to which a further appliance can be connected. In this case, the RF input signal, e.g. the antenna signal, is first routed to the first appliance, for example the DVD recorder, and the second appliance, e.g. a TV apparatus or the corresponding RF receiver, can then be connected to the loop-through RF output of the first appliance. The concept of loop-through is well known and extensively used in existing home RF appliances.

In conventional devices of this kind, the RF input signal is provided to an input, and typically buffered with a low-noise amplifier (LNA) forming a part of the analog pre-processing circuitry, and then made available at a loop-through output (LTO) for use by another device for receiving RF signals. In the conventional devices, stringent requirements are placed upon the avoidance of deterioration of signal quality by the analog pre-processing circuits. The analog pre-processing circuits therefore are relatively complex and require relatively large power dissipation which is disadvantageous in view of aspects like heat generation energy consumption, reliability and cost.

Recently, concepts for further improving such devices for receiving RF signals have been developed. A RF receiver that could be used in a DVD recorder is shown in FIG. 1 as an example for a device for receiving a RF signal 100. The device shown in FIG. 1 is implemented as a direct-sampling multi-channel RF tuner. As can be seen in FIG. 1, a RF input signal 2 is applied to an input 3. The RF input signal 2 is buffered with a low-noise amplifier (LNA) 4 and is made available at the loop-through output (LTO) 5 for use by another device for receiving RF signals. From the LNA 4 the RF input signal 2 is passed to a variable gain adjustment circuit (VGA) 6, an anti-aliasing circuit 7, and an analog-digital converter (ADC) 8 converting the RF input signal 2 to a digital signal 9. The analog-digital converter 8 is clocked by a clock signal fclock. The digital signal 9 is provided to a digital signal-processing unit (DSP) 10 digitally processing the signal.

In the device of FIG. 1, the RF signal spectrum applied at the input 3 is sampled in its entirety and the channel selection and frequency conversion is done in the digital domain, i.e. in the digital signal-processing unit (DSP) 10. A main advantage of such a concept is that a plurality of channels contained in the RF input signal can be received concurrently.

In the case that this concept of multi-channel direct sampling is used, new possibilities for the implementation of the analog pre-processing circuits are available. Digital signal processing techniques implemented in the digital signal-processing unit 10 can be used to compensate linear and non-linear distortions resulting from the analog pre-processing circuits. Since this possibility of compensating the linear and non-linear distortions in the digital signal processing unit 10 is provided, a simplified analog pre-processing circuitry 11 can be used resulting in increased non-linear distortions. In particular, a less complex low-noise amplifier 4 at the input can be used. Thus, the complexity and the power dissipation of the analog pre-processing circuitry 11 can be significantly reduced by such distortion compensation. In the upper part of FIG. 2, a) represents the RF input signal 2 at the input terminal 3; b) represents the signal after the analog pre-processing circuitry 11 comprising the LNA 4, the VGA 6, and the anti-aliasing circuit 7; and c) represents the signal after the digital signal processing unit 10. As indicated in b), the signal after the analog pre-processing circuitry 11 contains non-linear distortions schematically indicated by the two smaller arrows which are not present in the RF input signal schematically indicated in a). The digital signal processing in the digital signal processing unit 10 is then used to compensate these non-linear distortions introduced by the analog pre-processing circuitry 11, as shown in c).

However, if the digital signal processing in the digital signal processing unit 10 is used to enable simplification of the analog pre-processing circuitry 11 including the low-noise amplifier 4 acting as a buffer, the problem arises that distortion generated in this buffer is not compensated in the loop-through RF signal provided at the loop-through output 5.

OBJECT AND SUMMARY OF THE INVENTION

It is an object of the present invention to provide a device for receiving a RF signal and a method for looping a RF input signal through a device for receiving RF signals enabling a simplified pre-processing circuitry and at the same time providing a loop-through RF signal which does not contain distortions introduced by the pre-processing circuitry.

This object is solved by a device for receiving a RF signal with loop-through output according to claim 1. The device comprises an input receiving a RF input signal; an analog-digital converter converting the RF input signal to a digital signal; a digital signal processing unit digitally processing the digital signal; a digital-analog converter converting the processed digital signal to a loop-through RF signal corresponding to the RF input signal; and a loop-through output outputting the loop-through RF signal.

Since the loop-through RF signal corresponding to the RF input signal and output at the loop-through output is a signal resulting from the digital signal which is digitally processed by the digital signal processing unit, a loop-through RF signal is provided which does not comprise any distortions. Distortions, which have been present, are compensated in the digital signal-processing unit. Further, in the case that the input is connected to a cable network that delivers a mix of digital and analog modulated RF signals, digitally modulated or analog modulated signals, respectively, can be filtered out so that a device connected to the loop-through output does not receive any unnecessary signals. If digitally modulated signals are applied to the input, they can be converted to analog channels in the device so that they can be handled by legacy equipment such as video recorders.

Further, a parental lock function restricting or prohibiting viewing of selected channels can be implemented in the device. Furthermore, a rights management system can be implemented wherein only one channel or a restricted number of particular channels is passed through to the loop-through output and further information contained in the RF input signal is blocked in dependence of some access criterion.

Preferably, an analog pre-processing circuit pre-processing the RF input signal is provided between the input and the analog-digital converter. Thus, signal losses deteriorating the RF input signal can be reduced.

According to an aspect, the RF input signal comprises a plurality of channels and frequencies and the device for receiving a RF signal is adapted such that a RF signal spectrum applied at the input is sampled in its entirety, and the digital signal processing unit is adapted such that it performs channel selection and frequency conversion. In this case, a plurality of channels can be received concurrently.

According to another aspect, the digital signal-processing unit is adapted to cancel or compensate non-linear distortion effects caused by preceding analog circuits. Thus, less complex preceding analog circuits comprising less power dissipation can be used in the device for receiving a RF signal.

If the device is a direct-sampling multi-channel RF tuner, a plurality of channels can be received concurrently and processed concurrently in the digital signal-processing unit.

If an additional buffer is provided between the digital-analog converter and the loop-through output, the non-linear distortion of this buffer can be accounted for in the digital signal processing unit by means of pre-distortion.

According to an aspect, a plurality of individual loop-through outputs is provided. In this case, a plurality of further devices can be connected to the device and provided with loop-through RF signals.

The object is further solved by a method for looping a RF input signal through a device for receiving RF signals according to claim 8. The method comprises the steps: inputting a RF input signal to the device for receiving RF signals; converting the RF input signal to a digital signal; digitally processing the digital signal; converting the processed digital signal to a loop-through RF signal corresponding to the RF input signal; and outputting the loop-through RF signal at a loop-through output. In this case as well, distortions can be compensated in the digital signal-processing unit before the loop-through signal is output. Further, in the case that the RF input signal comprises a mix of digital and analog modulated RF signals, digitally modulated or analog modulated signals can be filtered out so that a device connected to the loop-through output does not receive any unnecessary signals.

If the analog RF input signal is pre-processed by an analog pre-processing circuit before being converted to the digital signal, signal losses deteriorating the RF input signal can be reduced.

According to an aspect, the analog RF input signal comprises a plurality of channels and frequencies; an input RF signal spectrum is sampled in its entirety; and the digital processing is performed in a digital signal-processing unit adapted to perform channel selection and frequency conversion. As a result, a plurality of channels can be received concurrently.

BRIEF DESCRIPTION OF THE DRAWINGS

The invention will be described in greater detail hereinafter, by way of non-limiting examples, with reference to the embodiments shown in the drawings.

DESCRIPTION OF EMBODIMENTS

First Embodiment

Figure 1:
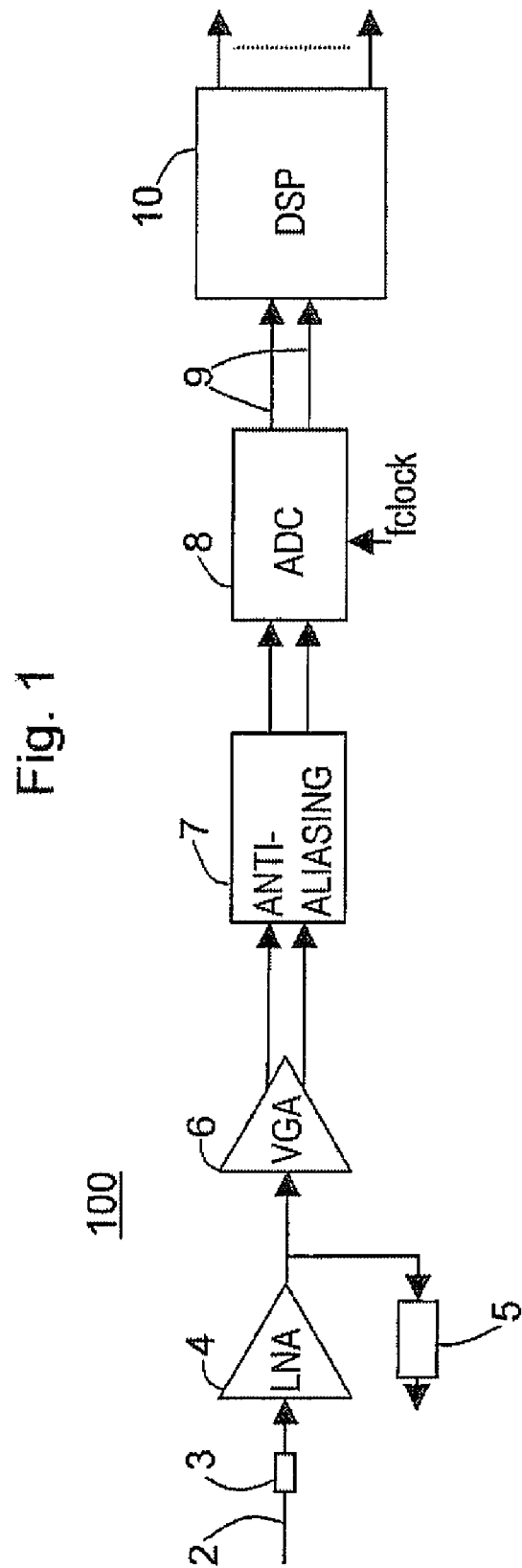
FIG. 1 shows an example of a device for receiving a RF signal with loop-through output.
Figure 2:
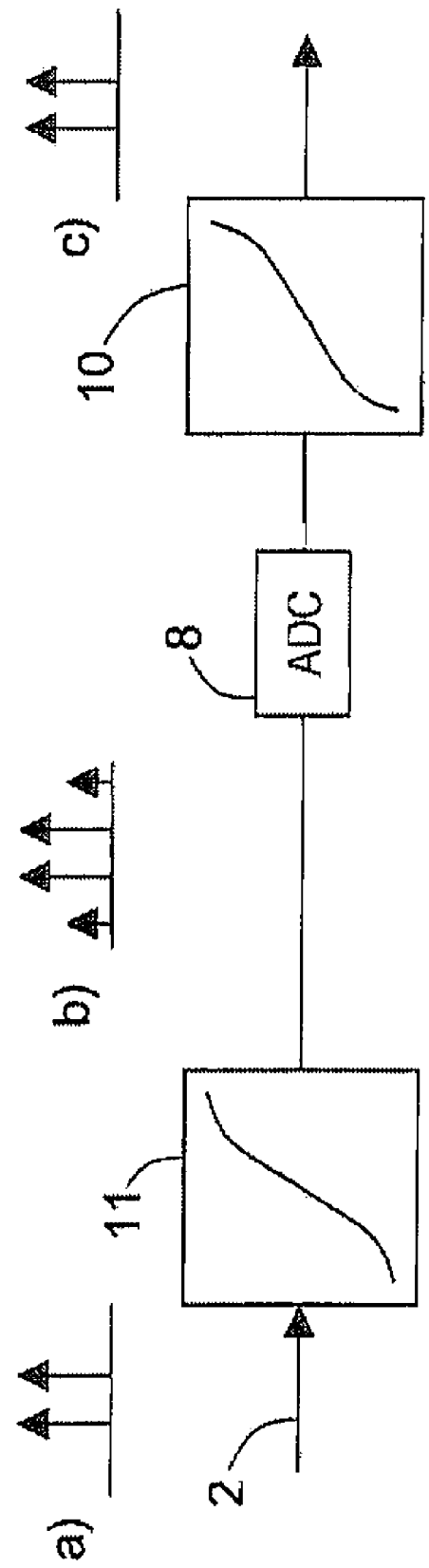
FIG. 2 schematically illustrates compensation of an analog block linear distortion in the digital domain.
Figure 3:
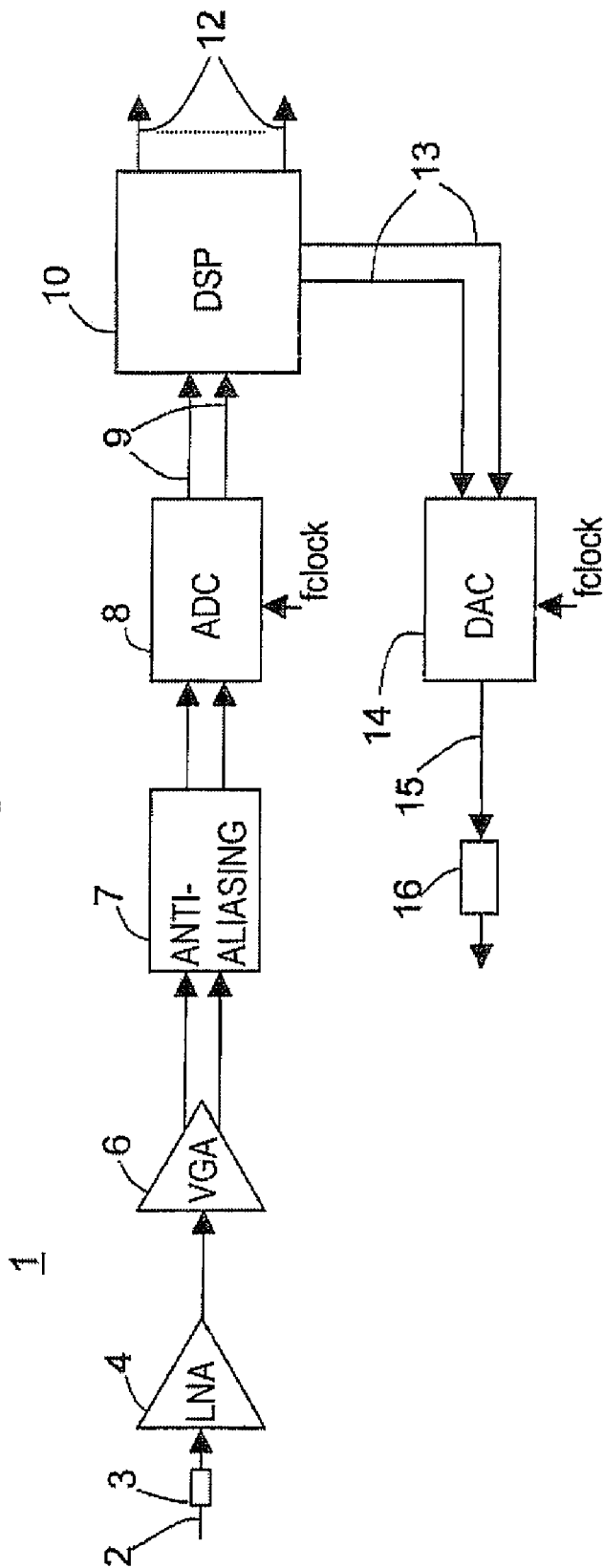
FIG. 3 shows a device for receiving a RF signal according to a first embodiment.

A device for receiving a RF signal with loop-through output according to a first embodiment is illustrated in FIG. 3. In the embodiment of FIG. 3, the device for receiving a RF signal is a RF receiver, which could be used in a DVD recorder, for example. Components which are identical to those described with reference to FIG. 1 above will be designated with identical reference numerals.

The device for receiving a RF signal 1 illustrated in FIG. 3 is implemented as a direct-sampling multi-channel RF tuner. As can be seen in FIG. 3, a RF input signal 2 is applied to an input 3. For example, the RF input signal 2 is an analog antenna signal received from a TV antenna. The RF input signal 2 is buffered with a low-noise amplifier (LNA) 4. Further, after passing the LNA 4, the RF input signal 2 is transmitted to a variable gain adjustment circuit (VGA) 6, an anti-aliasing circuit 7, and an analog-digital converter (ADC) 8 converting the RF input signal 2 to a digital signal 9. The analog-digital converter 8 is clocked by a clock signal fclock. The digital signal 9 is provided to a digital signal-processing unit (DSP) 10 digitally processing the signal.

The RF signal spectrum applied at the input 3 is sampled in its entirety. In the context of this application, sampled in its entirety is to be understood that not only a one channel is processed/sampled at a time but a plurality of channels or all channels contained in the RF input signal are processed/sampled simultaneously. In particular, this does not exclude the presence of some analog filtering to shape the desired spectrum before the digital signal-processing unit 10. For example, in case of the RF input spectrum containing both, a TV band (e.g. 50-850 MHz) and a satellite band (e.g. 950-2150 MHz), the satellite band could be filtered out before sampling the complete TV band, The digital signal processing unit (DSP) 10 performs channel selection, frequency conversion, and decimation and outputs signals 12 corresponding to particular channels to a plurality of channel decoders (not shown) as is schematically indicated. Further, the analog pre-processing circuitry formed by the low-noise amplifier 4 acting as a buffer, the variable gain adjustment circuit 6, and the anti-aliasing circuit 7 is implemented with a low degree of complexity and comprising low power dissipation. However, due to the low degree of complexity, the pre-processing circuitry introduces non-linear distortions to the signal. The digital signal-processing unit 10 is adapted such that it compensates for the non-linear distortions of the pre-processing circuitry and of the analog-digital converter 8. Further, the digital signal-processing unit 10 is implemented such that it outputs a processed digital signal 13 representing the RF input signal 2 to a digital-analog converter 14. The processed digital signal 13 corresponds to the digital signal 9 provided by the analog-digital converter 8, which has been processed such that distortions introduced by the pre-processing circuitry are compensated.

The digital-analog converter 14 is clocked by a clock signal fclock and converts the processed digital signal 13 to a loop-through RF signal 15 that is output to a loop-through output 16. The loop-through output 16 is adapted such that a further device for receiving a RF signal can be connected thereto. Thus, the digital signal-processing unit 10 is included in the loop from the input 3 to the loop-through output 16. In other words, the loop-through signal is tapped after the digital signal-processing unit 10. As a result, though a pre-processing circuitry having a low degree of complexity and low power dissipation is used, a high-quality loop-through signal is provided, since distortions introduced by the pre-processing circuitry are compensated in the digital signal-processing unit 10.

Second Embodiment

Figure 4:
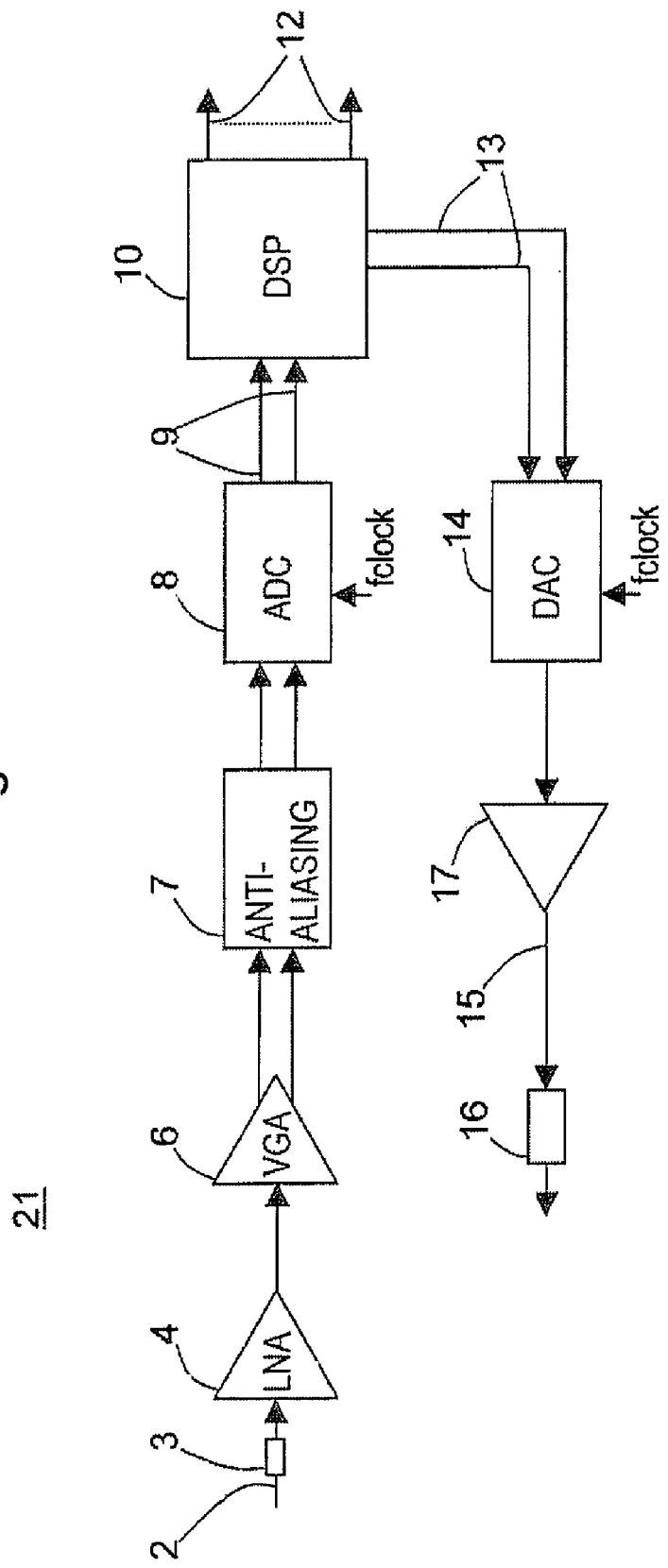
FIG. 4 shows a device for receiving a RF signal according to a second embodiment.

A second embodiment of the present invention is illustrated in FIG. 4. The device for receiving a RF signal 21 shown in FIG. 4 substantially corresponds to that described with regard to FIG. 3 and thus only the differences will be described in the following. The device 21 shown in FIG. 4 differs from the device 1 shown in FIG. 3 in that an additional buffer 17 is provided between the digital-analog converter 14 and the loop-through output 16. In this case, the digital signal-processing unit 10 is adapted such that the non-linear distortion introduced by the buffer 17 is compensated by means of an appropriate pre-distortion. Thus, a high-quality loop-through signal is provided even if an additional buffer introducing non-linear distortions is present in the loop from the input to the loop-through output 16.

Modifications

According to a modification, the input 3 is connected to a cable network, which delivers a mix of digital and analog modulated RF signals. A further device which is only capable of processing the analog modulated signals is connected to the loop-through output 16. The digital signal-processing unit 10 is adapted such that it filters out the digital modulated signals and provides only the analog modulated RF signals to the loop-through output 16. Thus, the further device does not receive any unnecessary signals.

Alternatively, the digital signal-processing unit 10 can be adapted such that the analog modulated signals are filtered out and only the digital modulated signals are provided to the loop-through output 16. This is advantageous if a device only capable of processing the digital modulated signals is connected to the loop-through output 16.

According to a further modification, the digital signal processing unit 10 is adapted such that digitally modulated signals contained in the RF input signal are converted to analog channels and the analog channels are provided to the loop-through output 16 as a loop-through signal 15. In this case, conventional equipment such as a video recorder can be connected to the loop-through output 16.

In a modification, a parental lock function restricting or prohibiting the viewing of selected channels is implemented in the digital signal-processing unit 10. Further, a rights management system can be implemented in the digital signal processing unit 10 which only passes one or a plurality of particular channels to the loop-through output, while the rest of the information contained in the RF input signal is blocked in dependence of a specific access criterion.

According to a further modification of the embodiments shown in FIG. 3 or 4, a plurality of individual loop-through outputs is provided with corresponding associated digital-analog converters. In this case, a plurality of further devices for receiving RF signals can be connected to the device for receiving a RF signal.

In a further modification, additionally frequency translator circuits are provided between the digital-analog converter 14 and the loop-through output 16. In a still further modification, the possibility of transposing signals from one channel frequency to another unoccupied channel frequency is implemented in the digital signal-processing unit 10.

It should be noted that combinations of the features mentioned with respect to the modifications and of the features mentioned with respect to the embodiments are possible.

The invention claimed is:

1. A device for receiving a Radio Frequency (RF) signal comprising:
   an input receiving a RF input signal;
   an analog to digital converter (ADC) converting the RF input signal to a digital signal;
   a digital signal processing unit digitally processing the digital signal, wherein the digital signal processing unit selectively filters out modulated signals;
   a digital to analog converter (DAC) converting the processed digital signal to a loop-through RF signal corresponding to the RF input signal; and
   a loop-through output outputting the loop-through RF signal.

2. The device according to claim 1, further comprising:
   an analog pre-processing circuit that pre-processes the RF input signal provided between the input and the ADC.

3. The device according to claim 1, wherein the RF input signal includes a plurality of channels and frequencies, the device for receiving a RF signal is adapted such that a RF signal spectrum applied at the input is sampled in its entirety, and the digital signal processing unit is adapted such that it performs channel selection and frequency conversion.

4. The device according to claim 1, wherein the digital signal-processing unit is adapted to cancel or compensate for non-linear distortion effects caused by preceding analog circuits.

5. The device according to claim 1, wherein the device is a direct-sampling multi-channel RF tuner.

6. The device according to claim 1, wherein a buffer is provided between the DAC and the loop-through output.

7. The device according to claim 1, wherein a plurality of individual loop-through outputs is provided.

8. The device of claim 1, wherein the digital signal processing unit implements a parental lock function.

9. The device of claim 8, wherein the parental lock function either restricts or prohibits viewing of selected channels.

10. The device of claim 1, wherein the digital signal processing unit implements a rights management system.

11. The device of claim 10, wherein the rights management system blocks access to particular channels in the RF input signal.

12. The device of claim 1, further comprising:
at least one frequency translator circuit.

13. The device of claim 12, wherein the at least one frequency translator circuit is disposed between the DAC and the loop-through output.

14. The device of claim 1, wherein the digital signal processing unit transposes signals from an occupied channel frequency to an unoccupied channel frequency.

15. The device of claim 1, wherein the input receives a mix of analog modulated and digital modulated signals.

16. The device of claim 15, wherein the digital signal processing unit filters out the digital modulated signals.

17. The device of claim 15, wherein the digital signal processing unit filters out the analog modulated signals.

18. A method for looping a RF input signal through a device for receiving RF signals, the method comprising:
inputting a RF input signal to the device for receiving RF signals;
converting the RF input signal to a digital signal;
digitally processing the digital signal and selectively filtering out modulated signals;
converting the processed digital signal to a loop-through RF signal corresponding to the RF input signal; and
outputting the loop-through RF signal at a loop-through output.

19. The method according to claim 18, wherein an analog pre-processing circuit processes an analog RF signal into the RF input signal.

20. The method according to claim 18, wherein the analog RF input signal includes a plurality of channels and frequencies, an input RF signal spectrum is sampled in its entirety, and the digital processing is performed in a digital signal processing unit adapted to perform channel selection and frequency conversion.

* * * * *